UNITED STATES PATENT OFFICE.

JOHN L. NOVARINE, OF BROOKLYN, NEW YORK, ASSIGNOR OF ONE-HALF TO STEARNS & GORDON, OF JERSEY CITY, NEW JERSEY.

PROCESS OF OBTAINING VANILLIN.

SPECIFICATION forming part of Letters Patent No. 565,919, dated August 18, 1896.

Application filed August 29, 1895. Serial No. 560,914. (No specimens.)

*To all whom it may concern:*

Be it known that I, JOHN L. NOVARINE, a citizen of the Republic of Switzerland, residing at Brooklyn, in the county of Kings and State of New York, have invented certain new and useful Improvements in Processes of Producing Vanillin, of which the following is a specification.

This invention relates to an improved process of making vanillin from eugenol or its derivatives by a direct and continuous process without the isolation of intermediary dichlorochromyl-eugenic compounds; and the invention consists of the process of producing vanillin by subjecting a solution of eugenol or its ether in glacial acetic acid to the action of a solution of chromylchlorid in the same solvent, diluting the resulting mixture with a sufficient quantity of water, extracting the products of the reaction, saponifying them, and finally isolating the vanillin by any well-known methods.

In carrying out my improved process eugenol obtained from the oil of cloves in the usual manner, or one of its ethers, is dissolved in glacial acetic acid. A solution of chromylchlorid in glacial acetic acid is then prepared and carefully added to the solution of eugenol until the reaction has taken place. The resulting mixture is then diluted with a sufficient quantity of water, whereby a second reaction takes place. The products of the reaction are extracted by means of ether or benzene, next saponified by means of an alkali in the usual way, and the alkaline mixture, on being acidified, gives up its liberated vanillin to ether or benzene, from which it can be easily separated by any of the well-known methods of purifying crude vanillin.

The following formula illustrates the reactions referred to:

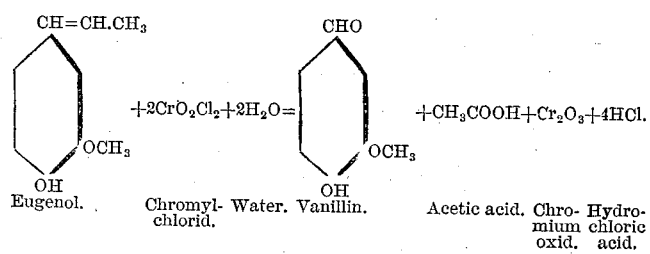

Eugenol. Chromyl-chlorid. Water. Vanillin. Acetic acid. Chromium oxid. Hydrochloric acid.

The proportions used correspond to the molecular proportions.

In this process vanillin is produced by a continuous process, as the reactions take place almost simultaneously in the same solution, but without separating the intermediary dichlorochromyl-eugenic compounds.

Having thus described my invention, I claim as new and desire to secure by Letters Patent—

The process herein described of producing vanillin from eugenol, which consists in subjecting a solution of eugenol or its ether in glacial acetic acid to the action of a solution of chromylchlorid in the same solvent, diluting the resulting mixture with a sufficient quantity of water, extracting the products of the reactions, saponifying them, and finally isolating the vanillin therefrom by any of the well-known methods, substantially as set forth.

In testimony that I claim the foregoing as my invention I have signed my name in presence of two subscribing witnesses.

JOHN L. NOVARINE.

Witnesses:
PAUL GOEPEL,
GEORGE W. JAEKEL.